United States Patent
Tierling (10) Patent No.: US 7,374,705 B2
(45) Date of Patent: May 20, 2008

(54) METHOD FOR MAXIMIZING THE SHARING OF TENSILE LOAD FOR CEMENT-SHEATHED MULTI-WALL PIPE

(75) Inventor: Kenneth Tierling, Conroe, TX (US)

(73) Assignee: Unisert Multiwall Systems, Inc., Conroe, TX (US)

( * ) Notice: Subject to any disclaimer, the term of this patent is extended or adjusted under 35 U.S.C. 154(b) by 48 days.

(21) Appl. No.: 11/454,339

(22) Filed: Jun. 16, 2006

(65) Prior Publication Data

US 2007/0290403 A1 Dec. 20, 2007

(51) Int. Cl.
*B28B 19/00* (2006.01)
(52) U.S. Cl. .................... 264/35; 264/262; 264/269; 264/333
(58) Field of Classification Search .................. None
See application file for complete search history.

(56) References Cited

U.S. PATENT DOCUMENTS

| | | | |
|---|---|---|---|
| 2,334,509 A | * | 11/1943 | Reeves ................. 425/405.1 |
| 2,695,255 A | * | 11/1954 | Avery ..................... 156/165 |
| 3,202,562 A | | 8/1965 | Lang et al. |
| 3,301,277 A | | 1/1967 | Kelly |
| 3,322,157 A | * | 5/1967 | Farris ..................... 138/172 |
| 3,414,055 A | * | 12/1968 | Vogt, Jr. .................. 166/276 |
| RE27,061 E | * | 2/1971 | Rubenstein ............... 156/86 |
| 3,662,045 A | | 5/1972 | Tierling |
| 4,876,049 A | * | 10/1989 | Aoyama et al. .......... 264/49 |
| 6,167,913 B1 | | 1/2001 | Wood et al. |

* cited by examiner

*Primary Examiner*—Edmund H. Lee
(74) *Attorney, Agent, or Firm*—Mary J. Gaskin (57) ABSTRACT

A method for installing a fiberglass or stainless steel liner into a steel casing which results in a reduction of strain on the casing. Conventional means are used to place the liner into the casing and to fill the annular space with cement. Thereafter, maximum design operating pressure on the liner is maintained while the pressure on the annular space is reduced; maintenance of those pressures keep the liner in an expanded state while the grout cures. As a result, the liner shares the load with the casing; pressure from the fluids contained in the system during operation is not transferred to the casing through the grout until the liner's preset internal pressure is reached. The use of the method greatly reduces the possibility of flowline failure.

13 Claims, 6 Drawing Sheets

METHOD FOR MAXIMIZING THE SHARING OF TENSILE LOAD FOR CEMENT-SHEATHED MULTI-WALL PIPE

BACKGROUND OF THE INVENTION

The invention relates to a method of installing liners in steel casings in order to increase the internal pressure containment capability of the flowline.

It is presently known to construct flowlines by installing thermoplastic liners in steel casings, or pipelines, in order to protect the casing from fluids being carried in the liner. Typically, the liner has a smaller outer diameter than the inside diameter of the casing, and the annular space between the two is filled with a solid material to protect the liner from any corrosion of the casing and to transfer stress through the solid material to the outside casing. One such method is described in U.S. Pat. No. 3,662,045, filed by the present inventor, which describes a method of installing a liner in a field flowline.

Over the years, improvements have been directed at changes in grouting techniques in order to protect the integrity of the liner, as well as methods of bonding the liner to the grout. More recently, the liners used have been inflatable or expandable into a cylindrical configuration after insertion into the pipeline. The methods used must contend with the fact that stress relaxation of the liner (creep) can reduce the internal pressure containment of the system. At any rate, the liners presently used do not contribute to the internal pressure bearing capability of the flowline because of the high elasticity of the liner relative to the pipe (casing) and grout.

It would be desirable to build a flowline with a liner that actually increases the internal pressure containment capability of a flowline.

SUMMARY OF THE INVENTION

The method described herein utilizes a rigid or semi-rigid liner, which is less susceptible to "creep" than a thermoplastic liner. The liner can be made from a material such as fibre-reinforced plastic (FRP), commonly called fiberglass, or from a metal such as stainless steel.

Heretofore, when used as a liner in IT-3 systems (casing, grout, and liner), freestanding fiberglass pipe undergoes normal expansion and contraction between the glass and the resin, which can result in failure of the system. The method described herein effectively eliminates this "Achilles' heel" of fiberglass pipe.

The installation of the fiberglass liner in a steel casing is similar to that for a thermoplastic liner, such as the method described in U.S. Pat. No. 3,662,045. Packing flanges installed at both ends of the pipeline seal the annular space and allow the liner to elongate and contract, depending upon axial loading. A pipeline pig is installed in the liner, and valves are placed at both ends of the liner. The pig is displaced through the pipeline with water, and the liner is pressurized. A thixotropic cement plug is pumped through the first valve, and then displaced with a fluid cement slurry through the annular space and out through the second valve. The annular space is sealed. The liner pressure is increased to its maximum design operating pressure (for example, to between 200 p.s.i. and 250 p.s.i.) and the annular pressure is reduced (to as low as 5 p.s.i., at the highest point of the line). The internal pressure in the liner will see equivalent strain in the hoop direction as well as the axial direction. While the internal liner pressure is maintained, the cement is allowed to cure, locking the fiberglass liner in place within the pipe. As a result of casting this pretension stress into the liner, the liner will not transfer stress to the casing through the grout until the preset internal pressure is reached. This liner pretension stress is available to the system as a reduction in the stress transferred to the outer casing by the fluid contained in the system during operation.

It is an object of the present invention to provide a rigid or semi-rigid liner for a steel casing that will be dependable and long-lasting in the field.

Another object of the present invention is to provide a method for installing a liner with improved internal pressure containment capability.

Still another object of the present invention is to provide a method of installing a liner that remains locked in place after grouting.

Yet another object of the present invention is to provide a method of installing a liner with minimal "creep."

One more object of the present invention is to provide a method of installing a fiberglass liner that removes the "Achilles' heel" normally associated with using a liner made of that material by eliminating the shear between the glass and the resin due to pressure cycling.

Other objects of the present invention will become apparent upon considering the description of the preferred embodiment disclosed herein.

DESCRIPTION OF THE PREFERRED EMBODIMENT

Figure 1:
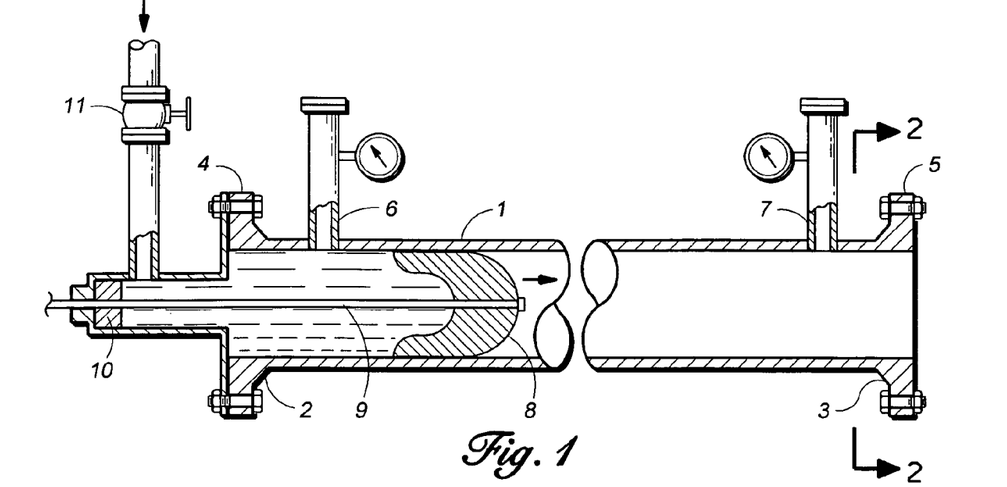
FIG. 1 is a sectional side view showing a method of pulling a cable through a pipeline.

FIG. 1 shows the previously-known steps taken in installing a liner in a steel casing 1. The first end 2 and the second end 3 of the steel casing 1 has been excavated and, after access holes have been cut, flanges 4 and 5 have been welded to the casing ends 1, 2. The wall of the casing 1 is tapped to provide inlet and outlet parts 6, 7, which are then blanked off. A pig 8, attached to one end of wireline 9, is introduced into second end 2. A conventional wireline lubricator 10, with an end of wireline 9 threaded therethrough, is bolted to flange 4. Air, nitrogen, or a fluid such as water is pumped into the casing 1 through the lubrication valve 11 to force pig 8 toward second end 3, drawing the wireline 9 into the casing 1. Alternatively, the liner 12 can be pushed into the casing 1.

Figures 2, 3:
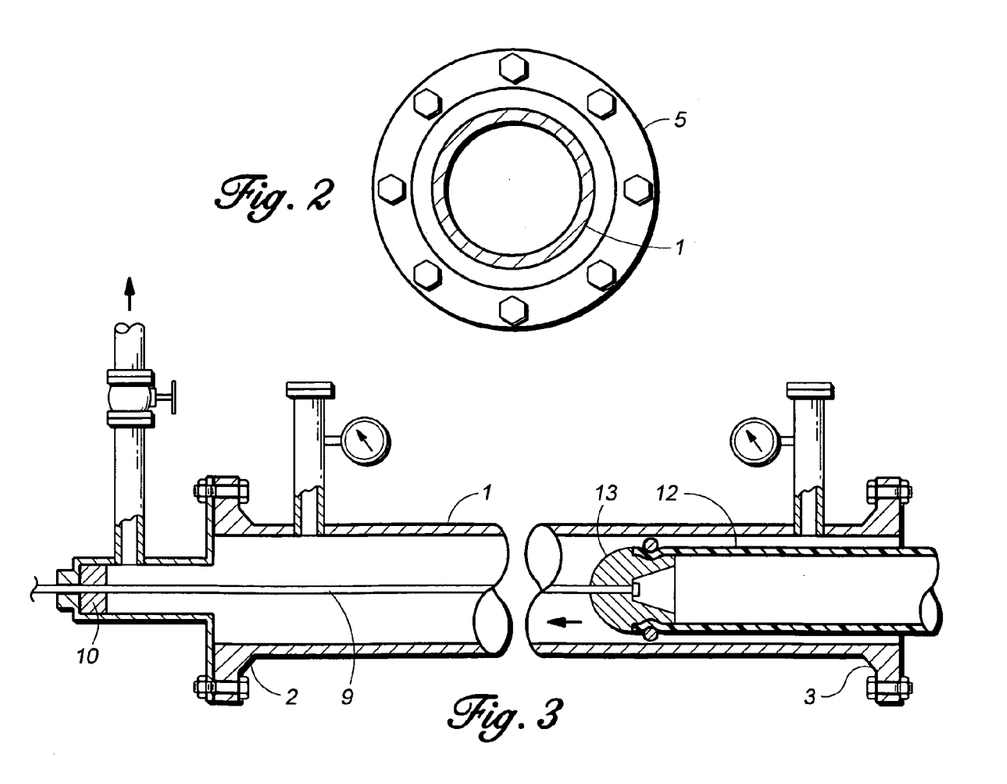
FIG. 2 is a cross-sectional view of the flowline taken along line 2-2 of FIG. 1.
FIG. 3 is a sectional side view showing a method of installing a liner in a pipeline.

FIG. 2 shows a cross-sectional view of the casing 1 with the flange 5 attached.

FIG. 3 shows the introduction of the liner 12 into the casing 1. The liner 12 is made from a semi-rigid or rigid material such as fibre-reinforced plastic (FRP), commonly called fiberglass, or from a corrosion-resistant metal such as stainless steel. Such materials have not heretofore been used as liners in flowlines. However, they offer significant advantages. Like thermoplastic liners, fiberglass and stainless steel liners are corrosion-resistant and have sufficient "flex" to be installed into an existing flowline for repair purposes. However, a fiberglass liner does not suffer from the same amount of "creep" that a thermoplastic liner does, which causes the liner to relax against the grout and can cause failure of a flowline. As shown in FIG. 3, a security plug 13 has been locked onto the liner 12, and the wireline 9 is then used to thread the liner 12 in and through the casing 1 from the second end 3. The lubricator 10 is removed and an excess of liner 12 is pulled through the first end 2.

Figure 4:
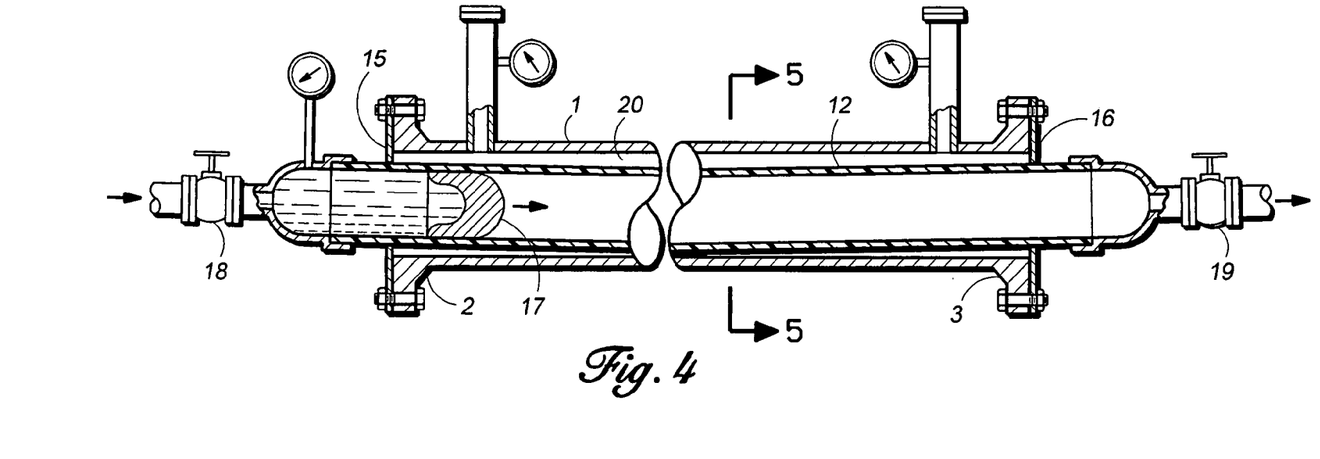
FIG. 4 is a sectional side view of the liner within the steel pipeline, showing the pig being displaced through the pipeline with the introduction of fluid into the liner.

As shown in FIG. 4, temporary packing flanges 15, 16 have been installed, one at each end 2, 3 of the casing 1. A pig 17 is installed into the liner 12, and liner valves 18, 19 are installed, one on each end of the liner 12. The pig 17 will be displaced through the liner 12 with water to insure an incompressible fill of the liner 12. The liner 12 is separated from the casing 1 by the annulus 20.

Figure 5:
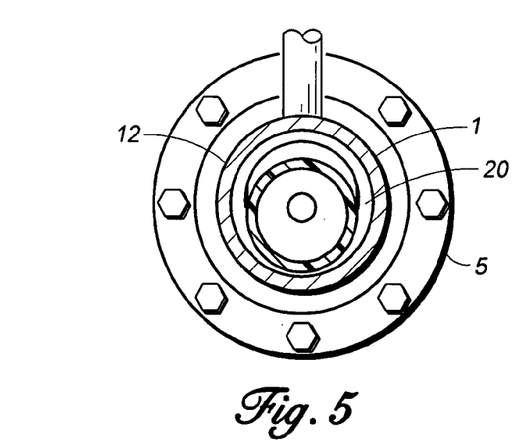
FIG. 5 is a cross-sectional view of the pipeline and liner taken along line 5-5 of FIG. 4.

FIG. 5 shows a cross sectional view of the casing 1, with the liner 12 installed and the annulus 20 separating the liner 12 from the casing 1.

Figure 6:
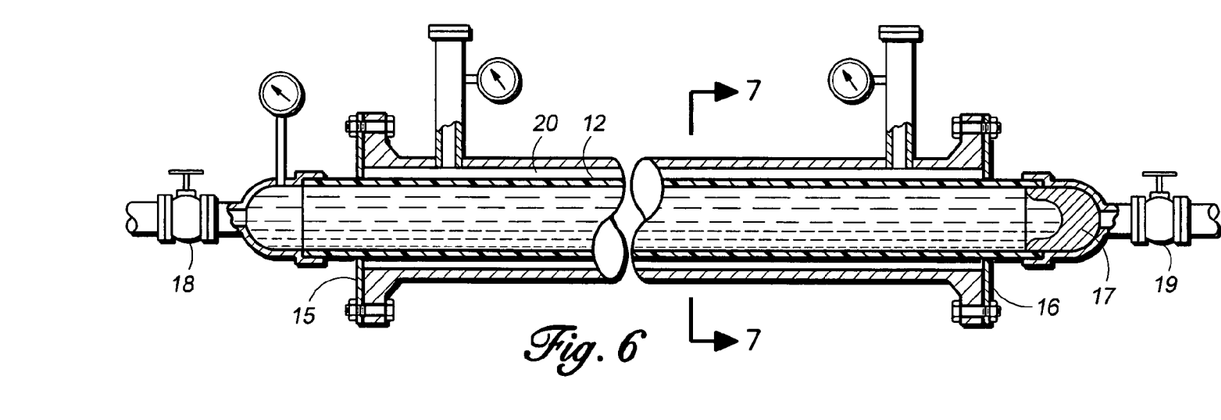
FIG. 6 is a sectional side view showing the pressurized liner.

As shown in FIG. 6, the pig 17 has moved to the opposite end of the liner 12. With liner valves 18, 19 closed, the liner 12 is then pressurized to that particular liner's maximum design operating pressure. The liner pressure can be adjusted as the grouting operation proceeds. The temporary packing flanges 15, 16 seal the annulus 20, yet allow the liner 12 to expand or contract, depending on axial loading.

Figure 7:
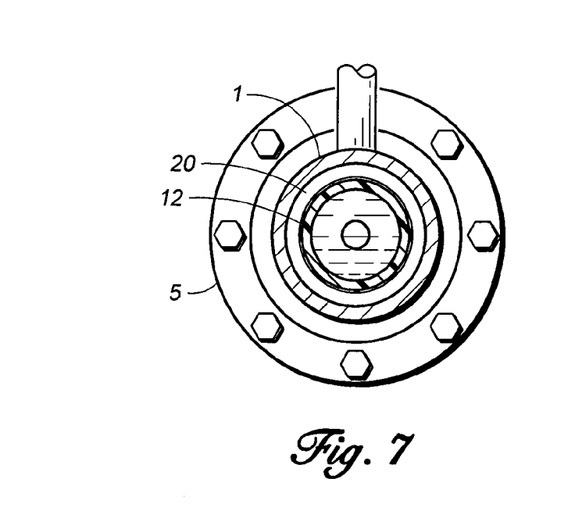
FIG. 7 is a cross-sectional view of the flowline taken along line 7-7 of FIG. 6.

FIG. 7 shows a cross sectional view of the liner 12 filled with water, with the annulus 20 separating the liner 12 from the casing 1, with flange 5 attached.

Figure 8:
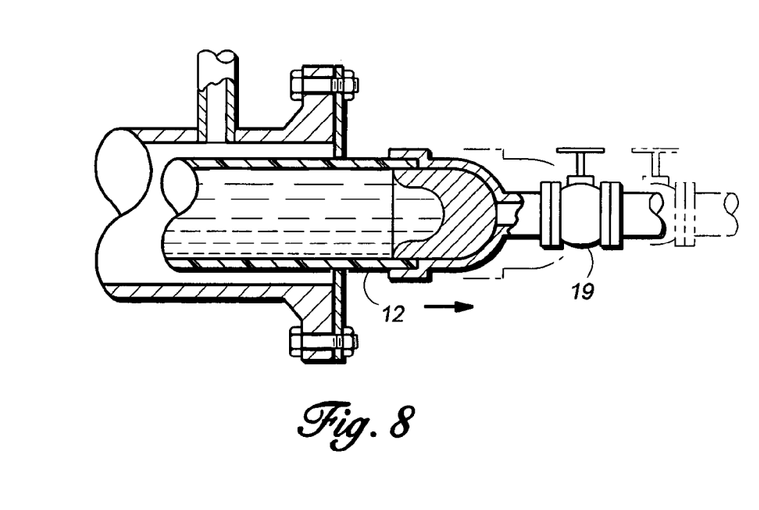
FIG. 8 is a sectional side view of an end of the pressurized liner, showing its axial movement.

As shown in FIG. 8, axial loading displaces the ends of the liner 12 (with valve 19 attached) in the axial direction.

Figure 9:
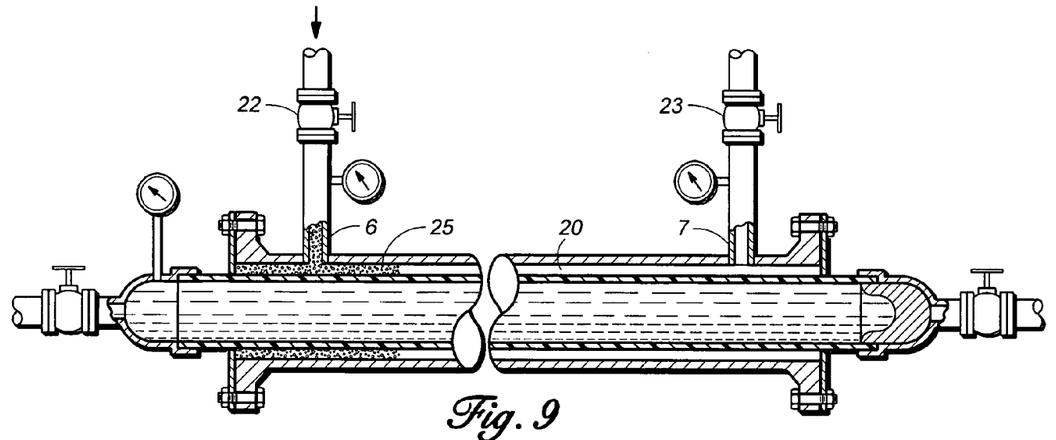
FIG. 9 is a sectional side view of the flowline showing the thixotropic slug being injected the annular space of the flowline.

FIG. 9 shows the beginning of the grouting process, utilizing cement valves 22, 23, which have been installed over ports 6, 7. A thixotropic (viscous) cement plug 25 is pumped through cement valve 22 into the annulus 20. Bentonite, or another suitable material, may be added to cement to create an effective cement plug 25, with the viscosity required for the particular application. In filling large annular spaces, use of the thixotropic cement plug 25 prevents voids in the cement from forming and compromising the system.

Figure 10:
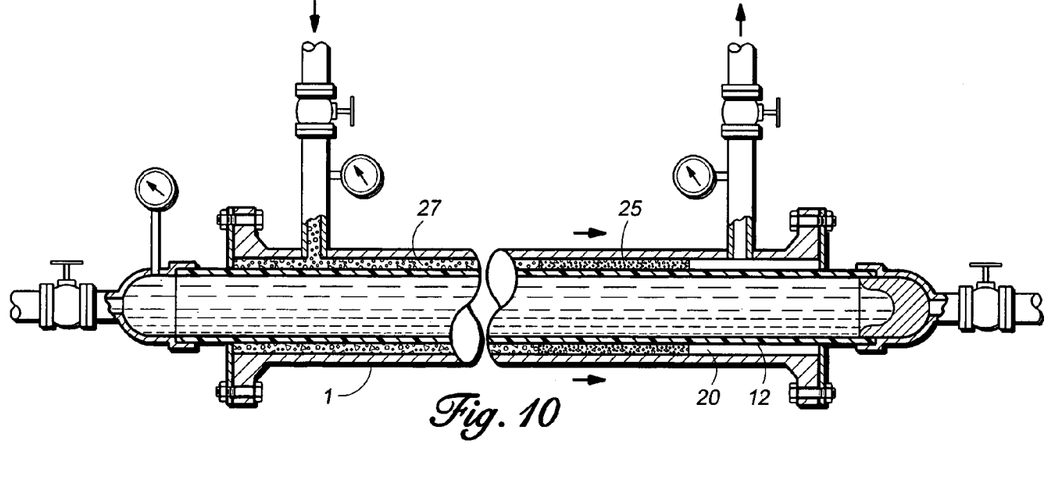
FIG. 10 is a sectional side view of the flowline showing the cement slurry being pumped into the annular space behind the thixotropic plug.

As shown in FIG. 10, the stable, less viscous cement slurry 27 is being pumped through cement valve 22 into the annulus 20, behind the cement plug 25. The thixotropic cement plug 25 will create resistance to flow and act like a liquid pig being displaced through the annulus 20 by the cement slurry 27. This allows the cement slurry 27 to be pumped further, with more distance between cement ports. The cement plug 25 can be designed to remain in the annulus 20, to set up and form part of the annular grout, with the required compressive strength to transfer stress to the outer casing 1. On the other hand, the cement plug 25 can be displaced from the annulus 20 out through cement valve 23, by movement of the cement slurry 27. In either event, in order to prevent voids in the cement, the pressurized liner 12 must have a positive buoyancy, since the liner 12 must rise through the cement slurry 27 as it fills the annulus 20. The particular cement additives used will vary depending on the application. For instance, vermiculite and proprietary foaming agents are specifically used to create thermal insulation properties in the annular grout. The impact of using insulation additives is reflected in the altered compressive strength. Alumina can be used to create grout expansion during the curing process. The compressive strength of the grout can be altered by the cement/water ratio and additives, but must always be greater than the line pressure being applied. Also, weight materials can be added to the cement slurry 27 to improve negative buoyancy.

Figure 11:
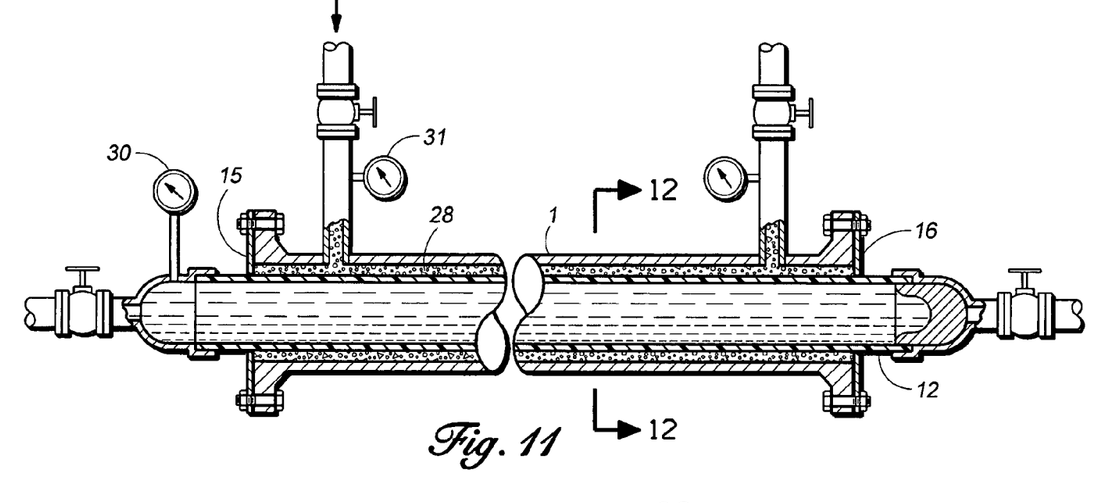
FIG. 11 is a sectional side view of the flowline, showing the annular grout surrounding the liner, which is being subjected to an internal pressure greater than the grout pressure while the grout is curing.

FIG. 11 shows the steps taken to improve the transfer of stress to the liner by tensioning the liner during the grouting of the annulus. Normally, the liner of a three layer IT-3 system (casing, grout, liner) does not contribute significantly to the internal pressure bearing capability of the IT-3 system because of the high elasticity of the liner relative to the grout and the casing. As disclosed herein, if pretension stress is cast into the liner during grouting, the liner will not begin to transfer stress to the casing, through the grout, until a present internal pressure is reached. This liner stress is maintained above the preset internal pressure, reducing the stress transferred through the liner to the casing by the amount of the preset internal pressure. This liner pretension stress is available to the system as a reduction in the stress transfer to the casing by fluids flowing through the IT-3 system during operation of the system. As a result, this preset internal pressure can be used to increase the internal pressure containment capability of an IT-3 system not using the method described herein. In any event, the calculations of present internal pressure available must take into consideration a reduction due to stress relaxation of the liner (creep), as well as the buildup of gas pressure in the annulus.

As shown in FIG. 11, the cement slurry (27), has filled the annulus (20) (hereinafter referred to as annular grout 28), some having been allowed to exhaust through the temporary packing flanges 15, 16, which are tightened to insure a sealed annular space. Pressure on the liner 12, displayed on pressure gauge 30, is increased, and the pressure on the annular grout 28, displayed on pressure gauge 31, is reduced to a minimal amount. Providing that the grout 28 is stable and does not shrink or expand, a zero expansion and contraction rate is established. The grout 28 is allowed to cure with pressure remaining on the liner 12, leaving the liner 12 and casing 1 locked firmly together. As a result, when the system is put into operation, the liner 12 will have to see that amount of pressure before any loading of the annular grout 28 occurs and any load will be transferred to the casing 1.

Figure 12:
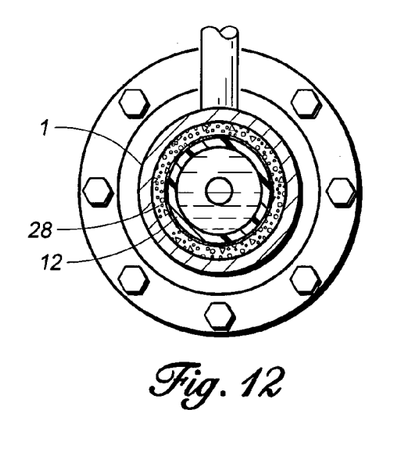
FIG. 12 is a cross-sectional view of the flowline, taken along line 12-12 of FIG. 11.

FIG. 12 shows a cross sectional view of the casing 1, the annular space having been filled with grout 28, and the liner 12 pressurized with water.

Figure 13:
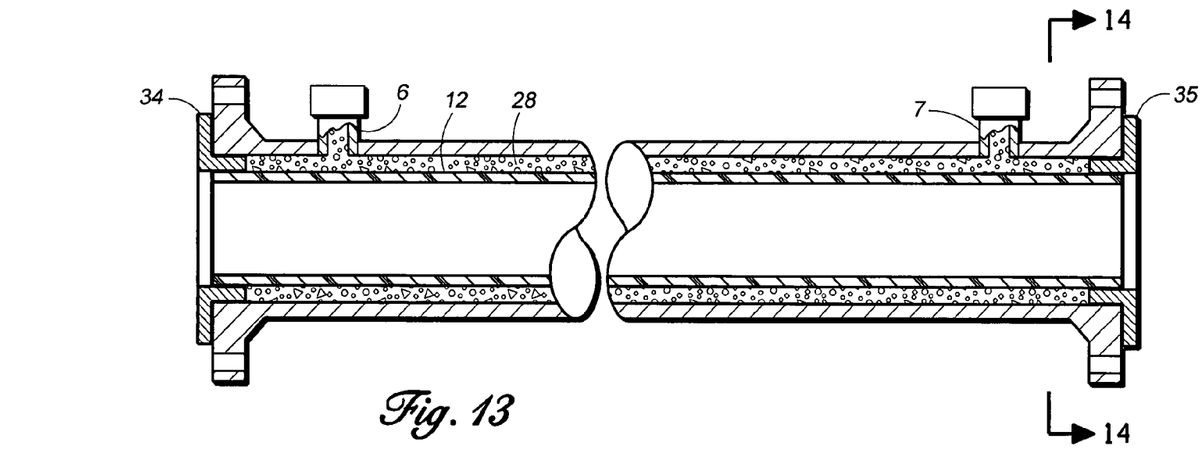
FIG. 13 is a sectional side view of the completed pipeline.

As shown in FIG. 13, the flowline system is complete. The annular grout 28 inside the casing 1 has cured. The temporary packing flanges have been removed and replaced with permanent packing flanges 34, 35, which seal the annular space. The cement valves (22, 23) have been removed and ports 6, 7 blanked off. The water has been pumped from the liner 12, and the flowline is now ready to transport line fluids.

Figure 14:
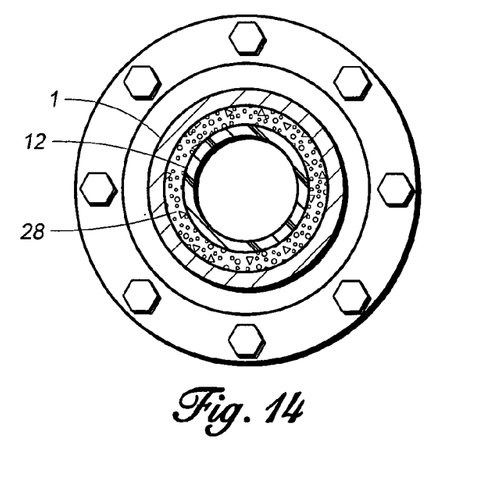
FIG. 14 is a cross-sectional view of the completed pipeline taken along line 14-14 of FIG. 13.

FIG. 14 shows a cross sectional view of the finished system, with the liner 12 sheathed in the grout 28 in the annular space, inside the casing 1.

As a typical example of the use of the present method, a 3000 foot 10-inch steel casing 1 flowline, operating at 600 p.s.i. pumping, produced fluids at 185° F. Internal corrosion resulted in a catastrophic failure of the pipe at 600 p.s.i. A fiberglass liner 12, designed for a 250 p.s.i. cyclic pressure, was installed through the 3000 foot segment. Prior to grouting, the liner 12 was pressurized to 200 p.s.i. After grouting and sealing the annular space, the pressure on the liner 12 was increased to 250 p.s.i. and the annular pressure was reduced to 5 p.s.i. at the highest point of the flowline, in this case, 25 feet. Due to the density of the grout 28, allowing 1 p.s.i. per foot of elevation, the pressure at the low end would be 30 p.s.i. With zero expansion or contraction of the grout 28, the pressure on the liner 12 will see 250 p.s.i. equivalent stream in the hoop direction as well as the axial direction. These pressures are maintained as the grout 28 is curing.

Because of the pressure exerted on the liner 12, use of the above-described method results in two distinct advantages. First, using this example, because installation took place at ambient temperatures, the introduction of line fluids at 185°, would normally result in axial loading due to thermal expansion; however, this effect is compensated for by the axial strain on the liner 12 which occurred during the installation and curing of the grout 28. Secondly, as a result of leaving the liner 12 in an expanded state while the grout cures, the liner 12 will share the load with the steel casing 1. In the present example, the liner's internal preset pressure containment capacity in the hoop direction is at least 230 p.s.i. Therefore, the liner 12 can hold at least 230 p.s.i. before any loading of the annular grout 28 results in the load being transferred to the outer casing 1.

The hoop strain reduction on the casing can be readily calculated for each system. For purposes of showing such a calculation, the liner 12 used is a length of 8-inch fiberglass pipe, with an inner diameter of 8.356 inches and a pressure rating of 300 p.s.i. free standing. The casing 1 into which it is installed is a 10-inch schedule 20 steel pipe with an inner diameter of 10.25 inches; and a pressure rating of 600 p.s.i. before lining. After the liner 12 is installed in the casing 1, using the above-described method, 250 p.s.i. is applied to the liner 12 during curing, and 0 (zero) p.s.i. is applied to the grout 28, allowing for a variance in line pressure of 20 p.s.i. due to the elevational change throughout the line. The pressure from the fluids being carried in the system must exceed 230 p.s.i. before any hoop strain will begin to transfer through the cured annular grout 28 to the steel casing 1.

The strain reduction on the casing 1 has two components. The first component is the reduction resulting from pressure on the liner 12 during grouting and curing. For a flowline operating at 600 p.s.i., the reduction is as follows:

$$600 p.s.i. - 230 p.s.i. = 370 p.s.i.$$

The second component is the reduction of the cross-sectional area related to the difference between the I.D. of the liner 12 and the I.D. of the casing 1. The area of the liner 12 is 54.865 square inches, and the area of the casing 1 is 82.516 inches, resulting in an area reduction to 66.485% of the casing 1 to the liner 12. The equivalent pressure on the casing 1 is figured as follows:

$$0.66485 \times 370 p.s.i. = 245.9945 p.s.i.$$

Therefore, the casing 1 will see the equivalent pressure of 245.9945 p.s.i. instead of the original pressure of 600 p.s.i. in the flowline. As a result, the possibility of flowline failure is greatly reduced.

I claim:

1. An improvement in the method of completing a multi-wall pipe flowline having a water-filled liner separated from a casing by an annular space, the improvement comprising the following steps:
   pressurizing the water-filled liner;
   pumping a thixotropic cement plug into the annular space;
   pumping a less viscous cement slurry into the annular space, behind the cement plug, until the annular space is filled;
   sealing the annular space;
   maintaining pressure on the liner and on the annular space while the cement slurry cures and becomes solid;
   the improvement ensuring that voids do not form in the cement slurry.

2. The improvement in claim 1 wherein the liner is constructed from a material selected from fibre-reinforced plastic (FRP) and metal.

3. The improvement in claim 2 wherein the fibre-reinforced plastic is fiberglass.

4. The improvement in claim 2 wherein the metal is stainless steel.

5. A method for providing a liner for sharing of tensile load for a cement-sheathed multi-wall pipe, the method comprising:
   installing the liner in a steel casing, the liner having a smaller outer diameter than an inner diameter of the casing, an annular space being defined between the liner and the casing, the annular space having a first end and a second end;
   installing temporary packing flanges to seal the first end and the second end of the annular space;
   allowing the liner to elongate and contract, depending upon axial loading;
   pressurizing the liner;
   filling the annular space with a cement slurry that does not shrink or expand while curing;
   sealing the annular space;
   thereafter increasing pressure within the liner to its maximum design operating pressure while lowering pressure on the annular space to a minimal amount;
   maintaining both the pressure within the liner and the minimal pressure on the annular space while the cement slurry cures and becomes solid grout;
   replacing the temporary packing flanges with permanent packing flanges.

6. The method of claim 5 wherein the liner is constructed from a material selected from fibre-reinforced plastic (FRP) and metal.

7. The method of claim 6 wherein the fibre-reinforced plastic is fiberglass.

8. The method claim 6 wherein the metal is stainless steel.

9. The improvement in the method of claim 1 wherein the cement plug is completely displaced from the annular space before the annular space is sealed.

10. A method for providing an improved cement-sheathed multi-wall pipe having a liner and an annular space, the method ensuring a void-free cement-filled annular space, with pretension stress being cast into the liner, the method comprising:

installing the liner in a steel casing, the liner having a smaller outer diameter than an inner diameter of the casing, the annular space being defined between the liner and the casing, the annular space having a first end and a second end;

installing temporary packing flanges to seal the first end and the second end of the annular space;

allowing the liner to elongate and contract, depending upon axial loading;

pressurizing the liner;

pumping a thixotropic cement plug into the annular space;

pumping a less viscous cement slurry into the annular space, behind the cement plug, until the annular space is filled, the cement slurry being one that does not shrink or expand while curing;

sealing the annular space;

thereafter, increasing pressure within the liner to its maximum design operating pressure while lowering pressure on the annular space to a minimal amount;

maintaining both the pressure within the liner and the minimal pressure on the annular space while the cement slurry cures and becomes solid grout;

replacing the temporary packing flanges with permanent packing flanges.

11. The method of claim 10 wherein the liner is constructed from a material selected from fibre-reinforced plastic (FRP) and metal.

12. The method of claim 11 wherein the fibre-reinforced plastic is fiberglass.

13. The method claim 11 wherein the metal is stainless steel.

* * * * *